United States Patent [19]

Piepenbreier et al.

[11] 4,354,850

[45] Oct. 19, 1982

[54] GEAR CLUTCH

[75] Inventors: Ernst Piepenbreier, Essen; Hansjochen Girod, Mülheim, both of Fed. Rep. of Germany

[73] Assignee: Thyssen Industrie AG, Fed. Rep. of Germany

[21] Appl. No.: 206,972

[22] Filed: Nov. 14, 1980

[30] Foreign Application Priority Data

Nov. 24, 1979 [DE] Fed. Rep. of Germany ....... 2947389

[51] Int. Cl.³ ............................................... F16D 9/00
[52] U.S. Cl. ...................................... 464/32; 74/405; 74/412 TA; 74/462
[58] Field of Search ................. 64/28 R, 30 R, 30 D, 64/30 A; 74/405, 411, 412 TA, 434, 462, 572

[56] References Cited

U.S. PATENT DOCUMENTS

| | | | |
|---|---|---|---|
| 1,160,311 | 11/1915 | Morse | 64/28 R |
| 1,849,174 | 3/1932 | Carter | 64/28 R |
| 2,356,322 | 8/1944 | Johnson | 64/28 R X |
| 2,394,669 | 2/1946 | Dean | 64/28 R |
| 2,964,931 | 12/1960 | Sorenson | 64/28 R |
| 3,435,695 | 4/1969 | Rivers | 74/412 TA |

FOREIGN PATENT DOCUMENTS

2420515 4/1975 Fed. Rep. of Germany ..... 64/28 R

*Primary Examiner*—John Petrakes
*Attorney, Agent, or Firm*—McGlew and Tuttle

[57] ABSTRACT

A gear clutch comprises an annular clutch casing with a plurality of internal teeth and a clutch hub having a plurality of external teeth meshed with the internal teeth. The clutch is coaxial with the clutch casing and the external teeth have a load bearing part and a root. The clutch hub has an annular axially extending groove extending into the root from one side of the external teeth and ending below the external teeth and an annular radially extending groove on an opposite side of the external teeth and defining with the axially extending groove a cylindrical annular break section of a size smaller than that of the load bearing part, whereby the break section breaks before the load bearing part breaks when the gear clutch is overloaded.

3 Claims, 2 Drawing Figures

GEAR CLUTCH

FIELD AND BACKGROUND OF THE INVENTION

The invention relates in general to a gear clutch and, in particular to a new and useful clutch having a clutch casing with internal teeth and at least one clutch hub which, due to its external teeth, sits in the casing coaxially and rotationally fixed to the casing, the hub having an axial annular groove which ends below the root of all the teeth of the clutch hub towards one side of the external teeth.

Such a clutch is known, according to the *Clutch Atlas* by A. Schalitz, 1975, A. G. T. Verlag Georg Thum, Ludwigsburg, page 15, FIG. 2.2-1. The axial annular groove therein together with a projection of a flange engaging it, serves to form a kind of labyrinth seal. The flange is attached to the clutch casing and closes the gear clutch off towards the outside. The material thickness between the annular groove and the root of the teeth of the clutch hub transmits, with sufficient safety, the maximum torque that can stress the teeth.

According to the same *Clutch Atlas*, page 21, FIG. 2.3-52, it is further known to mount one of the clutch hubs of the gear clutch rotatably on another hub fixed to the stub shaft of a motor or machine. The hubs have flanges which face each other and are interconnected by breakoff pins so that an overload can be prevented by breakage of the pins. This design requires many parts and the assembly is too long and too expensive due to the rotary mounting of the clutch hub. In addition, there is the danger that the pin fragments will leave their holes after breaking and be hurled away destructively.

SUMMARY OF THE INVENTION

It is an object of the present invention to provide a gear clutch of the type described above, which can transmit torques only up to a certain magnitude while requiring a relatively small space.

The invention comprises a clutch hub which has a radial annular groove on each opposite side of the external teeth and a material section roughly in the form of a cylinder barrel remaining between the annular grooves, the size of the section having smaller than the load-carrying section of all teeth of the clutch hub, to represent a predetermined breaking point in case of torque overload.

According to German Design Pat. No. 77 25 998 a gear clutch with torque limitation is known, its structural length, being small. However, the torque limitation consists in the breakoff of the teeth, caused by notches at the base of each tooth. Without a doubt, this measure does not yet represent the best torque limitation solution.

On the other hand, a single radial cut suffices in the invention to provide a predetermined breaking point for all teeth. If the tooth clutch has two symmetrically disposed clutch hubs, this cut can be located either on the clutch half on the motor side or on the clutch half on the transmission side. The cut can be made while machining the outside hub surface, in one operation, so that machining time and cost of the invention are hardly noticeable, considering the total expenditure. Compared to gear clutches of the same type, but without torque limitation, space requirements remain the same so that the clutch according to the invention is not impaired in its application. Since the clutch hub is evenly stressed in circumferential direction, the external teeth break off like a ring when overloaded and stay inside the clutch casing so that fragments which may otherwise fly around, cannot damage the adjacent parts or a jacket such as a clutch housing.

This aspect of the invention is particularly important when a gear clutch is disposed as connecting link between an electric motor and the pinion of an axle transmission for trackbound vehicles. Here, above all, damage to the vehicle is prevented which would have been caused by the reaction torques transmitted through the axle transmission housing. After the external teeth break off like a ring, no further damage can be caused. This makes it clear that major damage is averted.

Accordingly, an object of the present invention is to provide a gear clutch comprising an annular clutch casing with a plurality of internal teeth, a clutch hub having a plurality of external teeth meshed with the internal teeth of the clutch casing, the clutch hub being coaxial with the annular clutch casing, the external teeth having a load bearing part and a root, the hub having an annular axially extending groove extending into the root from one side of the external teeth and ending below the external teeth and an annular radially extending groove on an opposite side of the teeth leaving a cylindrical annular break section of the root of a size smaller than the load bearing part of the external teeth so that, the break section breaks away before the external teeth break in case the gear clutch is overloaded.

A further object of the invention is to provide a gear clutch between a motor and a transmission of a track bound vehicle.

A further object of the invention is to provide a gear clutch which has a breakaway safety feature which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
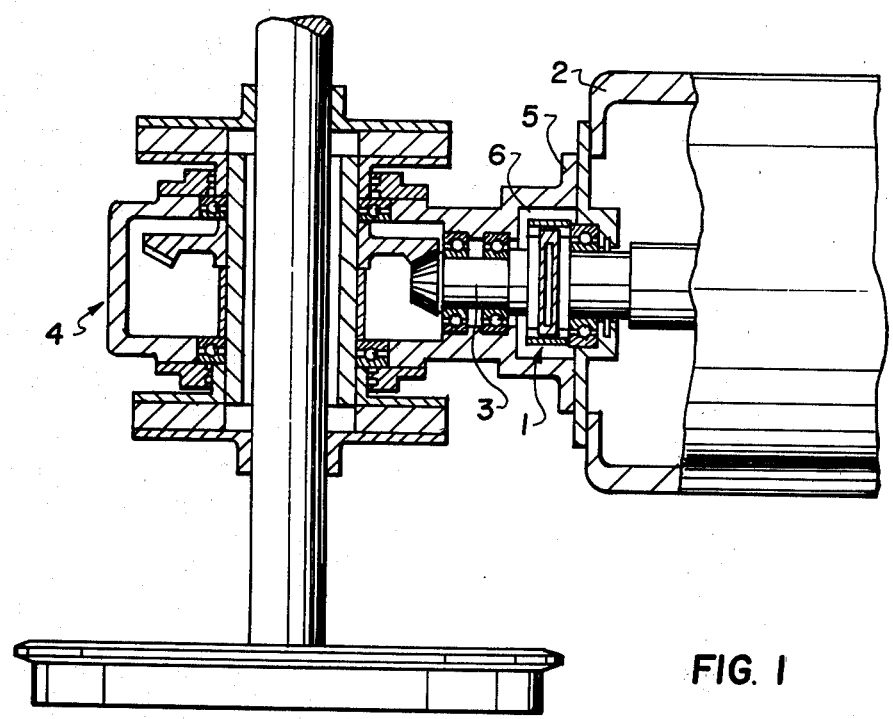
FIG. 1 is a top plan view with portions cutaway of a gear clutch connected between the motor and transmission of a track bound vehicle.

Turning to the drawings in particular, the invention embodied therein, in FIG. 1 comprises a gear clutch which is adapted to be connected between a motor device such as a motor and a transmitting device such as a transmission for a wheeled track bound vehicle, which gear clutch has a breakaway feature.

A gear clutch 1 transmits torque of an electric motor 2 to a pinion of an axle transmission 4 for trackbound vehicles. The electric motor 2 is fixed adjacent an axle transmission housing flange 5 which transitions into a spatial expansion 6 to accommodate the gear clutch 1. Consequently, the clutch 1 is enclosed on all sides by a load supporting part of the motor and transmission unit. Conventional safeties would whirl the broken parts around in this restricted space in case of intended breakage, thereby possibly cracking the transmission housing and endangering the motor suspension.

Figure 2:
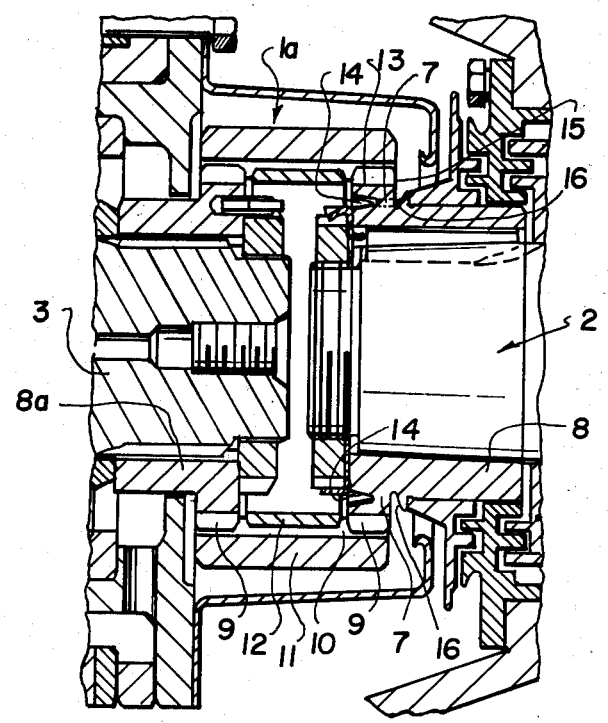
FIG. 2 is an enlarged view of a portion of FIG. 1 showing the details of the gear clutch according to the invention.

As may be seen in FIG. 2 showing a dual hub clutch, the gear clutch 1a prevents this by a cylindrical predetermined breaking point of the ring gear at 7. The ring gear breaks off in one piece due to the uniform circumferential force and remains inside the clutch.

In FIG. 2, the clutch hub on the motor side is designated 8 and the coaxial clutch hub on the pinion side 8a. Both clutch hubs have external teeth 9 facing each other and meshing latently with the internal teeth 10 of a clutch casing 11. Inserted in the interspace between the external teeth 9 in a recess of the internal teeth 10 is a retaining ring 12 to limit axial motions of the clutch casing 11. The retaining ring 12 hits the faces of the clutch hubs 8 and 8a.

Below the tooth root 13 the clutch hub 8 is provided with an axial annular groove 14 which is open toward the face of the external teeth 9. Flush with the tooth ends on the opposite side 15 of the external teeth 9 is a radial annular groove 16. This annular groove 16 penetrates radially so deep that its bottom, together with the bottom of the axial annular groove 14 defines a predetermined breaking point for the ring gear similar to a cylinder barrel.

While a specific embodiment of the invention has been shown and described in detail to illustrate the application of the principles of the invention, it will be understood that the invention may be embodied otherwise without departing from such principles.

What is claimed is:

1. A gear clutch comprising, an annular clutch casing with a plurality of internal teeth, a clutch hub having a plurality of external teeth meshed with said internal teeth, said clutch hub being coaxial with said clutch casing, said external teeth having a load bearing part and a root, said clutch hub having an annular axially extending groove extending into said root from one side of said external teeth and ending below said external teeth and an annular radially extending groove on an opposite side of said external teeth and defining with said axially extending groove a cylindrical annular break section of a size smaller than that of said load bearing part, whereby said break section breaks before said load bearing part breaks when the gear clutch is overloaded.

2. A gear clutch according to claim 1 including a pair of clutch hubs, one of which has said axially and radially extending grooves, one of said clutch hubs adapted to be connected to a motor and the other of said clutch hubs adapted to be connected to a pinion of a transmission of a trackbound vehicle.

3. A gear clutch according to claim 2, including a retaining ring positioned between said clutch hubs in said clutch casing for establishing a minimum spacing between said clutch hubs.

* * * * *